(12) United States Patent  
Mauri

(10) Patent No.: US 6,575,570 B2  
(45) Date of Patent: Jun. 10, 2003

(54) SPECTACLE FRAME

(75) Inventor: Stefano Mauri, Venegono Inferiore (IT)

(73) Assignee: M.M. Evolution S.r.l. (IT)

( * ) Notice: Subject to any disclaimer, the term of this patent is extended or adjusted under 35 U.S.C. 154(b) by 0 days.

(21) Appl. No.: 09/973,647

(22) Filed: Oct. 5, 2001

(65) Prior Publication Data

US 2003/0067584 A1 Apr. 10, 2003

(51) Int. Cl.⁷ .................................................. G02C 5/14
(52) U.S. Cl. ........................ 351/116; 351/121; 351/153; 16/228
(58) Field of Search ................................ 351/116, 119, 351/121, 153; 16/228

(56) References Cited

U.S. PATENT DOCUMENTS

| 1,649,792 A | * | 11/1927 | Welsh | 351/153 |
| 4,832,478 A | * | 5/1989 | Salce | 351/121 |
| 4,978,209 A | | 12/1990 | Ohba | 351/153 |
| 5,594,511 A | | 1/1997 | Lin | 351/116 |

FOREIGN PATENT DOCUMENTS

| EP | 0495767 | 7/1992 |
| FR | 2626682 | 8/1989 |
| WO | PCT/EP89/00881 | 7/1989 |
| WO | PCT/US94/06115 | 5/1994 |

* cited by examiner

*Primary Examiner*—Huy Mai  
(74) *Attorney, Agent, or Firm*—Robert F. I. Conte; Barnes & Thornburg

(57) ABSTRACT

In a framework for eyeglasses the support legs (3) are in engagement with the lens-holding structure (2) through hinge pins (9) mounted rigid with the lens-holding structure (2) or, alternatively, with the legs themselves, and adapted to be coupled with articulation seatings (10). Each articulation seating (10) is defined by a first engagement portion (10a) formed in the respective leg (3) or, alternatively, in the lens-holding structure (2), and a second engagement portion (10b) formed in a covering element (11) to be rigidly engaged in a recess (12) defined in the frames (1).

14 Claims, 4 Drawing Sheets

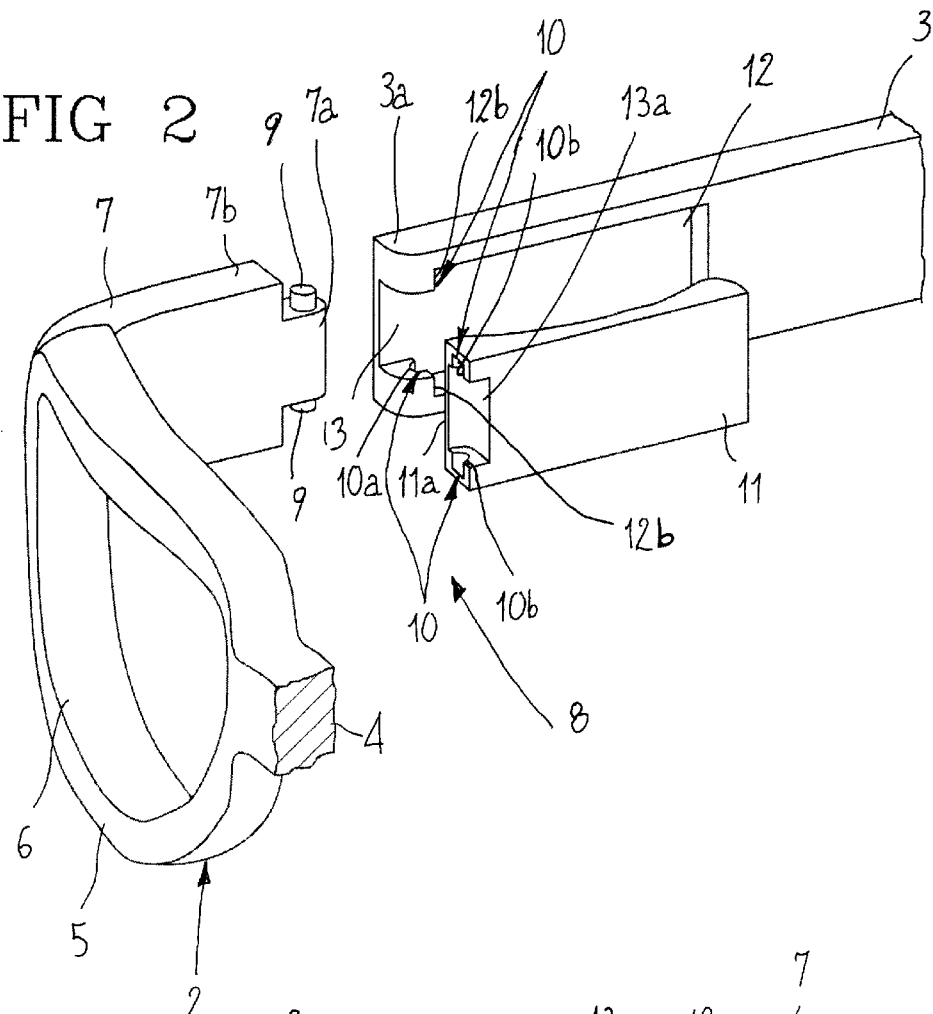
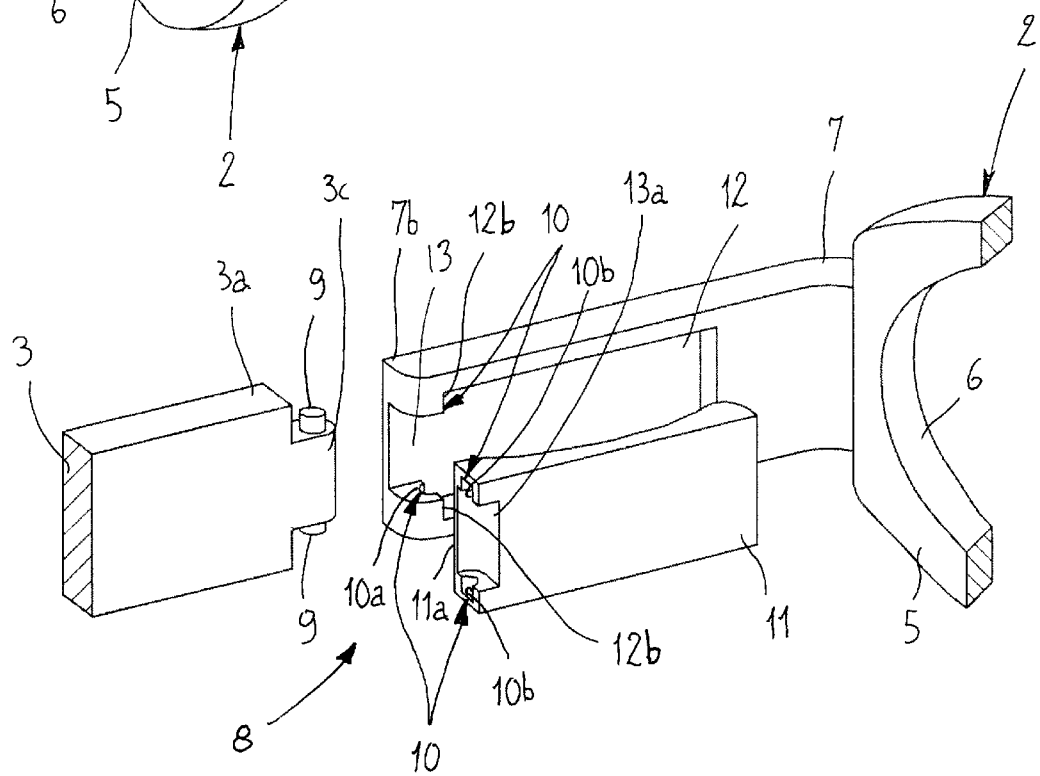

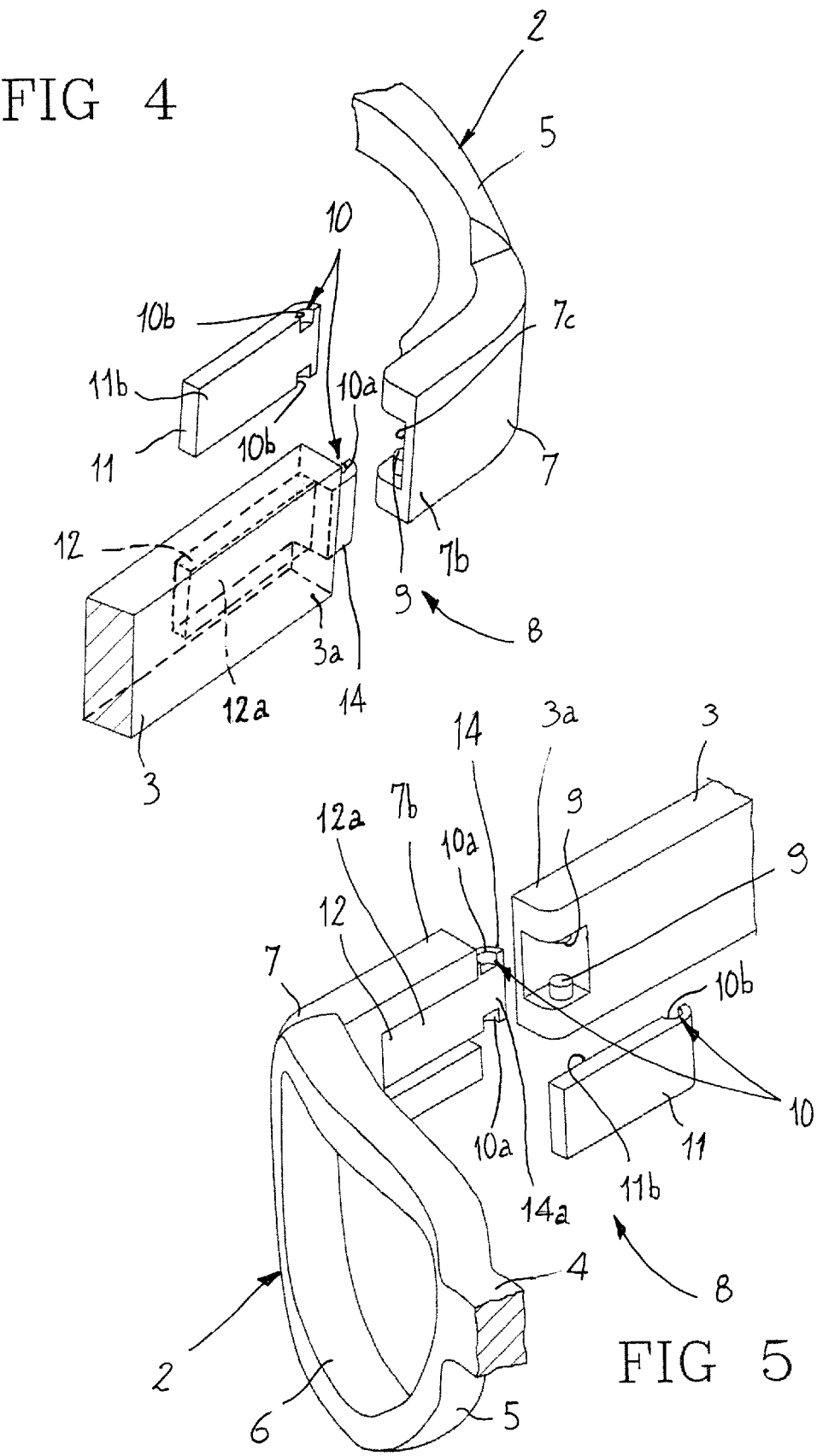

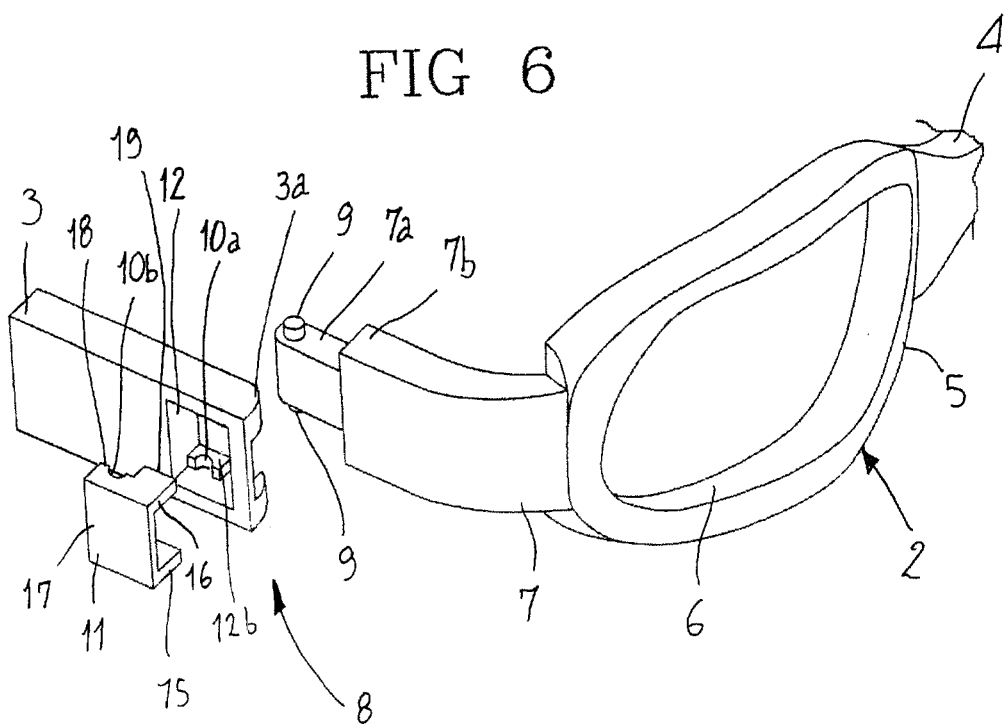

SPECTACLE FRAME

FIELD AND BACKGROUND OF THE INVENTION

The present invention relates to a spectacle-frame (in the following also "frames" for the sake of brevity) comprising: a lens-holding structure; two support legs in engagement with the lens-holding structure and movable between a closed condition in which they lie in a plane substantially parallel to the lying plane of the lens-holding structure and an open condition in which they lie in planes substantially perpendicular to the lying plane of the lens-holding structure; connecting means operatively interposed between each support leg and the lens-holding structure to ensure a junction therebetween.

It is known that frameworks for eyeglasses usually comprise a lens-holding structure and two support legs each of which is rotatably connected with the lens-holding structure through a hinge connection. Usually, each hinge connection comprises a first hinged portion rigidly in engagement with the lens-holding structure and a second hinged portion rigidly in engagement with the respective support leg. Each hinged portion has a through hole which is coincident with the through hole of the other portion so that together they define an articulation housing for engagement of a hinge pin.

Hinge connections of the above described type, projecting from the frames and directly visible thereon, undesirably affect the aesthetic quality of glasses. In an attempt to overcome this problem, the hinged portions are integrated in one piece into the lens-holding structure and the respective support legs, so that they are as much as possible concealed.

However, since the hinge pin must engage the through holes of the hinged portions by insertion from the outside, achievement of a surface of homogeneous structure is impossible. In fact, at least one hole corresponding to the articulation housing can be seen on the frames structure, causing a disagreeable aesthetic effect.

In addition, known frames have problems concerning material recycling. In more detail, separation of the hinge pins, usually made of metal material, from the frames generally made of plastic material is of difficult accomplishment.

The Applicant has further found that known frames can also be improved in terms of practical use and easy assembling/disassembling of the components as well as in terms of production times and costs.

SUMMARY OF THE INVENTION

It is an aim of the present invention to solve the problems found in the known art by providing frames that are aesthetically agreeable, of easy recycling, and adapted to be manufactured at reduced production costs.

The above and still further aims that will become more apparent in the course of the following description are substantially achieved by a framework for eyeglasses wherein the connecting means for each support leg comprises: at least one hinge pin mounted rigid with the frames; at least one articulation seating for rotatable engagement of the hinge pin, which seating is defined by a first engagement portion formed in the frames and a second engagement portion formed in a covering element to be associated with the frames.

BRIEF DESCRIPTION OF THE DRAWINGS

Further features and advantages will be best understood from the detailed description of a preferred, but not exclusive, embodiment of a framework for eyeglasses in accordance with the present invention. This description will be taken hereinafter with reference to the accompanying drawing given by way of non-limiting example, in which:

FIG. 2 is a fragmentary perspective view of the framework for eyeglasses seen in FIG. 10, to an enlarged scale;

FIG. 3 is a perspective view to an enlarged scale of a detail of the frames in a second embodiment;

FIG. 4 is a perspective view of an enlarge detail of the frames in a third embodiment;

FIG. 5 is an enlarged perspective view of a detail of the frames in a fourth embodiment;

FIG. 6 is a further perspective view to an enlarged scale of a detail of the frames in a fifth embodiment;

FIG. 7 is an enlarged perspective view of a detail of the frames in a sixth embodiment.

DESCRIPTION OF THE PREFERRED EMBODIMENTS

Figure 1:
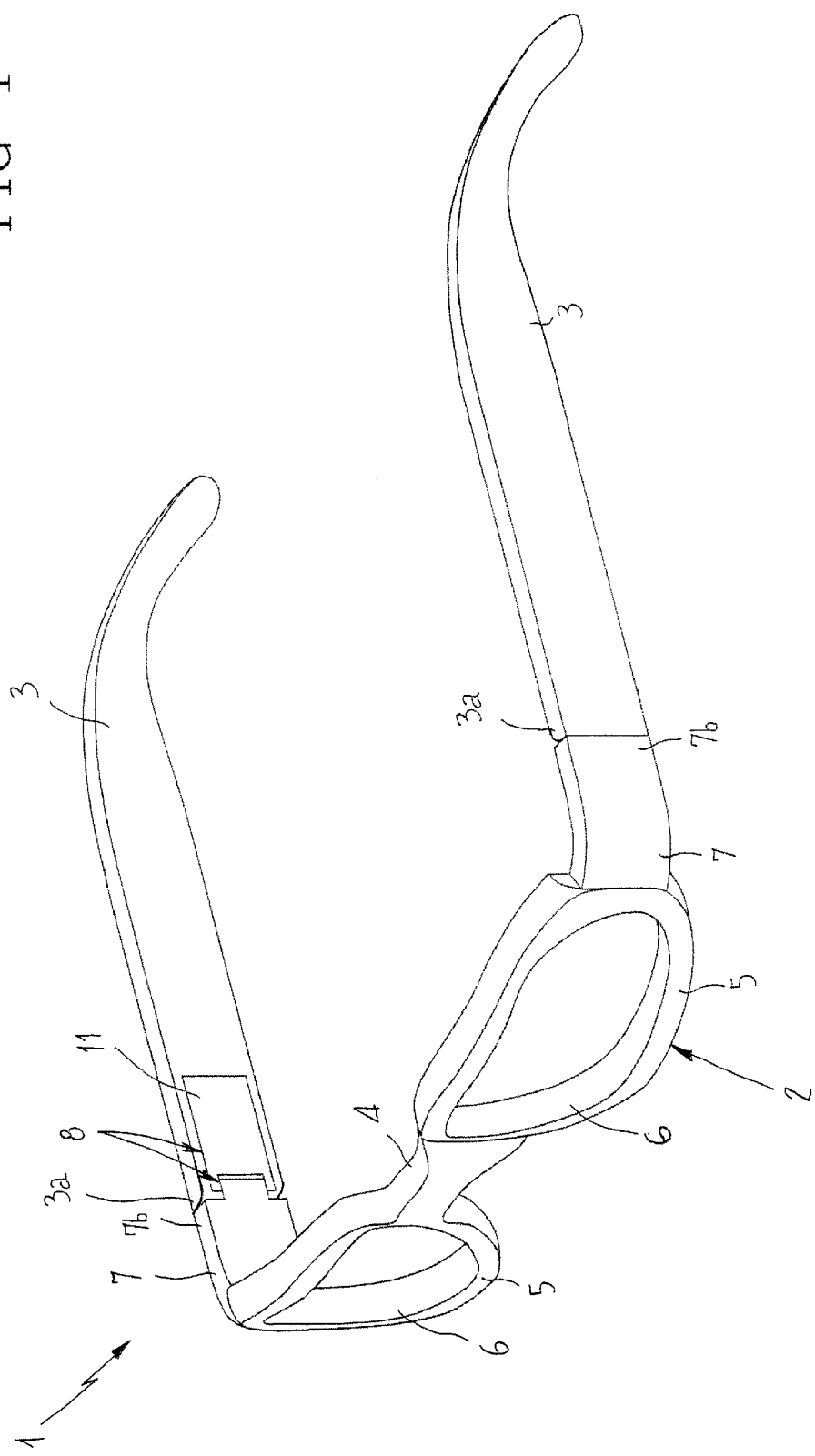
FIG. 1 is a perspective view of a framework for eyeglasses in accordance with the present invention, in a first embodiment.

With reference to the drawings, a framework for eyeglasses in accordance with the present invention has been generally Identified by reference numeral 1.

As viewed from FIG. 1, frames 1 comprise a lens-holding structure 2 to which two support legs 3 are rotatably connected. The lens-holding structure 2 has a central rest portion 4, suitable to fit the user's nasal septum, from which two frame-like portions 5 in opposition to each other extend, to define holding seatings 6 for respective lenses (not shown).

Extending from each frame-like portion 3 and at an opposite position relative to the central rest portion 4 is a side support shoulder 7 engaging, through connecting means 8, the respective support leg 3. In known manner, each leg 3 is movable between a closed condition in which it substantially lies in a plane parallel to the lying plane of the glass-holding structure 2 and an open condition in which it lies in a plane substantially perpendicular to the lying plane of the lens-holding structure 2.

The connecting means 8 comprises, for each support leg 3, at least one hinge pin 9 and at least one articulation seating 10 to be rotatably engaged by the hinge pin 9. In more detail, for each support leg 3 two hinge pins 9 are preferably provided and for each side support shoulder 7 two articulation seatings 10 are preferably provided.

Each articulation seating 10 is defined by a first engagement portion 10a formed in frames 1 and a second engagement portion 10b formed in a covering element 11 to be fastened to the frames themselves, preferably within a recess 12 defined by said frames.

As viewed from FIG. 2, in a first embodiment, the hinge pins 9 are made unitary wits the respective side support shoulder 7 and project externally thereof. More specifically, the hinge pins 9 project upwardly in a substantially vertical direction and downwardly from a coupling lug 7a jutting out in the extension of an end portion 7b of the respective side support shoulder 7.

The first engagement portions 10a the respective articulation seatings 10 are formed in respective shoulders 12b defined within the recess 12 provided in the support leg 3. In detail, shoulders 12b are placed at an end 3a of the respective support leg 3 and lie in a plane substantially normal to the support leg itself.

Formed on the covering element 11 and more particularly along a perimetric edge 11a of the latter, are the second engagement portions 10b to be coupled with the respective first engagement portions 10a to define the respective articulation seatings 10.

When frames 1 are assembled, the coupling lug 7a of each leg 3 is fitted in a locating cavity 13 formed in the extension of recess 12 between the shoulders 12a carrying the first engagement portions 10a, and terminates at a seating 13a defined in the perimetral edge 11a of the covering element 11 carrying the second engagement portions 10b.

With reference to FIG. 3, a second embodiment is therein shown in which, as compared with the embodiment in FIG. 2, positioning of the components of the connecting means 8 carried by legs 3 and the glass-holding structure 2 respectively, are mutually exchanged. In fact, the hinge pins 9 are unitary with the respective support legs 3 whereas the recess 12 provided with the articulation seatings 10 is defined in the lens-holding structure 2.

Under this situation, the hinge pans 9 project externally of a coupling protrusion 3c carried by an end portion 3a of the respective support leg 3, whereas the first engagement portions 10a are formed in at least one shoulder 12b defined in the recess 12 provided in the side support shoulder 7.

In accordance with a third solution shown in FIG. 4, he connecting means 8 comprises two hinge pins 9 of one piece construction with the respective side support shoulder 7. More specifically, the hinge pins 9 project from opposite inner walls of a respective indentation 7c present in the side support shoulder 7.

The connecting means 8 further comprises two articulation seatings 10 the first engagement portions 10a of which are formed in a contact surface 14a (not shown in FIG. 4) of an engagement lug 14 carried at the end by the respective support leg 3. Preferably, the contact surface 14a of the engagement lug 14 extends in a plane substantially parallel to leg 3 in the open condition, in a coplanar relationship with, and in the extension of, a bottom wall 12a of the recess 12 adapted to engage the respective covering element 11.

Unlike the embodiments shown in FIGS. 1 to 3, the second engagement portions 10b are formed in an inner side 11b of the covering element 11 facing the bottom wall 12a of the recess 12.

When the covering element 11 is engaged in recess 12, the inner side 11b acts in abutment against the bottom wall 12a and the contact surface 14a of the engagement lug 14, thereby defining the articulation seatings 10 through the first and second engagement portions 10a, 10b.

Shown in FIG. 5 is a fourth embodiment of the present invention which is very similar to the preceding embodiment, in which however positioning of the components of the connecting means 8 associated with the lens-holding structure 2 and legs 3 respectively, is inverted. In more detail, the hinge pins 9 are associated with the support legs 3 within the respective indentations 7c and the articulation seatings 10 are associated with the side support shoulder 7. In this case, as clearly shown in FIG. 5, the engagement lug 14 juts out in cantilevered fashion from the respective side support shoulder 7 in the direction of the respective support leg 3, and the contact surface 14a thereof extends without interruption from the bottom wall 12a of recess 12 defined in the side shoulder 7 to receive the covering element 11 carrying the second engagement portions 10b on its inner side 11b facing the bottom wall 12a.

As shown in FIG. 6, in a fifth embodiment of the present invention the hinge pins 9 are associated with the respective side support shoulders 7 and the articulation seatings 10 are formed in the support legs 3. In particular, the hinge pins 9 are disposed in the same manner as described with reference to the first embodiment shown in FIGS. 1 and 2, i.e. projecting in a vertical direction from a coupling lug 7a placed in the end portion 7b of the respective side support shoulder 7.

The locating recesses 12 are each defined by a through opening of a substantially quadrangular shape essentially extending perpendicular to the extension of the respective support leg 3. One or more shoulders 12b project within each recess 12, in a plane substantially parallel to the longitudinal extension of leg 3 in an open condition, and formed at said shoulders 12 are the first engagement portions 10a of the articulation seatings 10.

The covering element 11 seen in cross section shows a substantially C-shaped profile defined by a lower portion 15, an upper portion 16, and a connecting side portion 17 interposed between the lower portion 15 and upper portion 16. More specifically, both the lower portion 15 and upper portion 16 have an abutment side edge of irregular profile provided with a first step 18 in which the second engagement portion 10b of the articulation seating 10 is formed and with a second substantially flat step 19 extending a greater distance from the connecting side portion 17 than seep 18.

When the covering element 11 is engaged in recess 12, the first step of the lower and upper portions 15, 16 is in abutment against the respective shoulder 12b placed within the recess 12. In this condition the first and second engagement portions 10a, 10b define the articulation seating 10 for the respective hinge pin 9.

Shown in FIG. 7 is a sixth embodiment similar to the fifth one in which positions of the hinge pins 9 and articulation seatings 10 are inverted.

The present invention solves all problems found in the known art and achieves the intended purposes.

First of all, the frames in accordance with the invention are aesthetically improved due to the presence of the connecting means 8 performing their hinge function between the lens-holding structure 2 and the support legs 3, while surface homogeneity and matching shapes are maintained in said frames 1 seen as a whole. In other words, the connecting means 8 enables the aesthetically-unpleasant surface holes to be eliminated while completely concealing the hinge pins 9 to sight. Consequently, this connecting means 8 enables a wide design freedom as regards the aesthetic shapes of the frames.

In addition, the concerned frames can be assembled and/or disassembled in an easy and practical manner. In this connection it is to be pointed out that in each of the proposed embodiments due to the construction conception of the connecting means 8, when the support leg 3 s oriented in the closed condition in the absence of the respective covering element 11, said leg can be freely moved in a longitudinal and/or transverse direct on to cause engagement and disengagement of pins 9 with and from the first engagement portions 10a. Once the covering element 11 has been fitted in the respective recess 12 and fastened thereto, by restrained fixing or gluing for example, leg 3 is definitively linked to pins 9. Preferably, as provided in each of the above-discussed embodiments, when leg 3 is in the open condition the first engagement portions 10a define an undercut giving rise to a steady link with the hinge pins 9. In other words, each leg 3 when it is in the open condition can remain steadily linked to the lens-holding structure 2 even in the absence of the respective covering element 11. Due to this condition there Is the absence of any sort of stress on the covering elements 11 during normal use of the glasses, for the benefit of a simple and reliable connection of legs 3.

Also to be noted is the fact that all components of the concerned frames can be advantageously made of injection-moulded plastic material. Since manufacture of the frames components and assembling of same can be optimized, the production costs of eyeglasses in general are consequently reduced.

What is claimed is:

1. A spectacle-frame comprising:

a lens-holding structure (2);

two support legs (3) in engagement with the lens-holding structure (2) and movable between a closed condition in which the support legs lie in a plane substantially parallel to the lying plane of the lens-holding structure (2) and an open condition in which the support legs lie in planes substantially perpendicular to the lying plane of the lens-holding structure (2);

connecting means (8) operatively interposed between each support leg (3) and the lens-holding structure (2) to ensure a junction therebetween;

wherein the connecting means (8) for each support leg (3) comprises:

at least one hinge pin (9) mounted rigid with said spectacle-frame (1);

at least one articulation seating (10) for rotatable engagement of the hinge pin (9), which seating is defined by a first engagement portion (10a) formed in the spectacle-frame (1) and a second engagement portion (10b) fixed with respect to the first engagement portion, wherein the second engagement portion is formed in a covering element (11) fastened to the spectacle-frame.

2. The spectacle-frame as claimed in claim 1, wherein each hinge pin (9) is associated with the lens-holding structure (2) and the first engagement portion (10a) of each articulation seating (2) is formed in the respective support leg (3).

3. The spectacle-frame as claimed in claim 2, wherein each hinge pin (9) projects externally of a coupling lug (7a) carried by an end portion (7b) of the lens-holding structure (2), and the first engagement portion (10a) of each articulation seating (10) is formed in a recess (12) defined in the respective support leg (3) for housing of the covering element (11).

4. The spectacle-frame as claimed in claim 3, wherein in each support leg (3) the recess (12) is defined by a through opening and the first engagement portion (10a) is formed in a shoulder projecting in said through opening in a plane substantially parallel to the longitudinal extension of the respective support leg (3).

5. The spectacle-frame as claimed in claim 2, wherein each hinge pin (9) projects from at least one inner wall of an indentation (7c) formed in the lens-holding structure (2), and the first engagement portion (10b) of the respective articulation seating (10) is formed in a contact surface (14a) of an engagement lug (14) carried at the end by the corresponding support leg (3), the contact surface (14a) of the engagement lug (14) extending in the extension of a bottom wall (12a) of a recess (12) formed in the support leg (3) for engagement of the covering element (11).

6. The spectacle-frame as claimed in claim 1, wherein each hinge pin (9) is associated with the respective support leg (3) and the first engagement portion (10a) of each articulation seating (10) is formed in the lens-holding structure (2).

7. The spectacle-frame, as claimed in claim 6, wherein each hinge pin (9) projects externally of an engagement lug (14) disposed at an end portion (3a) of the respective support leg (3), and the first engagement portion (10a) of each articulation seating (10) is formed in a recess (12) defined in the lens-holding structure (2) for housing of the covering element (11).

8. The spectacle-frame as claimed in claim 7, wherein each recess (12) is defined by at least one through opening and the first engagement portion (10a) of the articulation seating (10) is formed in a shoulder (12b) protecting in said through opening in a plane substantially parallel to the longitudinal extension of the respective support leg (3) in the open condition.

9. The spectacle-frame as claimed in claim 6, wherein each hinge pin (9) projects from at least one inner wall of a recess formed in the support leg (3) and the first engagement portion (10b) of the respective articulation seating (10) is formed in a contact surface (14a) of an engagement lug (14) carried at the end by the lens-holding structure (2), the contact surface (14a) of the engagement lug (14) extending in the extension of a bottom wall (12a) of a recess (12) formed in the lens-holding structure (2) for engagement of the covering element (11).

10. The spectacle-frame as claimed in claim 1, wherein said first engagement portion (10a) is formed at a recess (12) arranged in the spectacle-frame for housing of the covering element (11).

11. The spectacle-frame as claimed in claim 10, wherein said first engagement portion (10a) is formed in a shoulder (12b) defined within said recess (12) in a plane substantially perpendicular to the support leg (3) in an open condition, said second engagement portion (10b) being formed on a perimetric edge (11a) of the covering element (11).

12. The spectacle-frame as claimed in claim 10, wherein said first engagement portion (10a) is formed in a contact surface (14a) of an engagement lug (14) extending in a plane substantially parallel to the support leg (3) in an open condition, in the extension of a bottom wall (12a) of said recess (12), said second engagement portion (10a) being formed on an inner side (11b) of the covering element (11) facing said bottom wall (12a).

13. The spectacle-frame as claimed in claim 10, wherein said first engagement portion (10a) is formed in a shoulder (12b) defined within said recess (12) in a plane substantially parallel to the support leg (3) in an open condition, said second engagement portion (10b) being formed on a side edge (18, 19) of the covering element (11).

14. The spectacle-frame as claimed in claim 1, wherein said first engagement portion (10a) defines an undercut in said spectacle-frame for steady engagement of the hinge pin (9) when the respective support leg (3) is in the open condition.

* * * * *